US010404695B2

(12) United States Patent
Jang

(10) Patent No.: US 10,404,695 B2
(45) Date of Patent: Sep. 3, 2019

(54) PORTABLE BIOMETRIC AUTHENTICATION DEVICE AND TERMINAL DEVICE USING NEAR FIELD COMMUNICATION

(71) Applicant: SAMSUNG ELECTRONICS CO., LTD., Suwon-si, Gyeonggi-do (KR)

(72) Inventor: Won-Churl Jang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 119 days.

(21) Appl. No.: 15/333,343

(22) Filed: Oct. 25, 2016

(65) Prior Publication Data

US 2017/0126672 A1    May 4, 2017

(30) Foreign Application Priority Data

Oct. 29, 2015    (KR) .................. 10-2015-0151099

(51) Int. Cl.
| | |
|---|---|
| *H04L 29/06* | (2006.01) |
| *H04W 12/06* | (2009.01) |
| *H04W 4/80* | (2018.01) |
| *G06F 3/0354* | (2013.01) |

(52) U.S. Cl.
CPC ...... *H04L 63/0861* (2013.01); *H04L 63/0428* (2013.01); *H04L 63/0492* (2013.01); *H04L 63/0853* (2013.01); *H04W 4/80* (2018.02); *H04W 12/06* (2013.01); *G06F 3/03547* (2013.01)

(58) Field of Classification Search
CPC ............... G06F 21/305; G06F 13/4022; G06F 3/03547; H04L 9/3231
USPC ....................................................... 713/171
See application file for complete search history.

(56) References Cited

U.S. PATENT DOCUMENTS

| | | | |
|---|---|---|---|
| 8,395,478 | B2 | 3/2013 | Diab et al. |
| 8,766,772 | B2 | 7/2014 | Martinez de Velasco Cortina et al. |
| 8,799,999 | B2 | 8/2014 | Rombouts |
| 9,237,018 | B2 * | 1/2016 | Popowski ............. H04L 9/3231 |
| 2007/0118758 | A1 * | 5/2007 | Takahashi ............. G06F 21/305 713/186 |
| 2007/0131759 | A1 | 6/2007 | Cox et al. |

(Continued)

FOREIGN PATENT DOCUMENTS

| | | |
|---|---|---|
| JP | 2006-060392 A1 | 3/2006 |
| JP | 2011-048523 A | 3/2011 |

(Continued)

*Primary Examiner* — Bryan F Wright

(74) *Attorney, Agent, or Firm* — Volentine, Whitt & Francos, PLLC

(57) ABSTRACT

A portable biometric authentication device communicates with a terminal device using near field communication (NFC). The portable biometric authentication device includes; a NFC antenna, a power supply circuit that generates at least one power voltage in response to an electromagnetic field generated by the terminal device and received via the NFC antenna, a sensor subsystem that operates in response to the at least one power voltage and includes a biometric sensor that acquires biometric information from a user, and a control subsystem that operates in response to the at least one power voltage and includes a NFC controller that controls the communication of the biometric information to the terminal device using the NFC antenna.

13 Claims, 16 Drawing Sheets

(56) References Cited

U.S. PATENT DOCUMENTS

| | | |
|---|---|---|
| 2007/0181672 A1 | 8/2007 | Sawamura |
| 2009/0144456 A1* | 6/2009 | Gelf .................... G06F 13/4022 |
| | | 710/8 |
| 2011/0267173 A1* | 11/2011 | Nielsen ............... G06K 19/0723 |
| | | 340/10.1 |
| 2012/0105200 A1 | 5/2012 | Yoo et al. |
| 2013/0067551 A1* | 3/2013 | Frew ..................... H04L 9/3215 |
| | | 726/7 |
| 2013/0162594 A1* | 6/2013 | Paulsen .................. G06F 3/044 |
| | | 345/174 |
| 2013/0231046 A1 | 9/2013 | Pope et al. |
| 2013/0254117 A1* | 9/2013 | von Mueller ...... G06Q 20/3829 |
| | | 705/71 |
| 2014/0013406 A1* | 1/2014 | Tremlet .................. G06F 21/32 |
| | | 726/5 |
| 2015/0121541 A1 | 4/2015 | Fay |
| 2015/0127549 A1 | 5/2015 | Khan |
| 2015/0127553 A1 | 5/2015 | Sundaram et al. |
| 2015/0155737 A1* | 6/2015 | Mayo ...................... H02J 5/005 |
| | | 320/108 |
| 2016/0063232 A1* | 3/2016 | Seol .................... G06F 3/03547 |
| | | 726/19 |
| 2016/0306350 A1* | 10/2016 | Shim .................... G05D 1/0016 |

FOREIGN PATENT DOCUMENTS

| | | |
|---|---|---|
| KR | 1020090071947 A | 7/2009 |
| KR | 1020100029918 A | 3/2010 |

* cited by examiner

PORTABLE BIOMETRIC AUTHENTICATION DEVICE AND TERMINAL DEVICE USING NEAR FIELD COMMUNICATION

CROSS-REFERENCE TO RELATED APPLICATION

This application claims the benefit of Korean Patent Application No. 10-2015-0151099 filed on Oct. 29, 2015, the disclosure of which is hereby incorporated by reference in it entirety.

BACKGROUND

The inventive concept relates to a portable biometric authentication device and a terminal device. More particularly, the inventive concept relates to a portable biometric authentication device and a terminal device capable of communicating using near field communication (NFC).

Electronic devices may require personal authentication in order to provide functions such as making payment, using a banking service, controlling physical entry, etc. Personal authentication requires high degree of accuracy and security, and various forms of biometric authentication have been used to provide personal authentication. Biometric authentication is usually based on one or more types of biometric information (e.g., a fingerprint, an iris, a finger vein, voice, etc.) provided by a user.

Biometric authentication is very convenient, since it frees the user for such requirements as carrying various card(s) and key(s) or memorizing passwords. In addition, biometric information is difficult to counterfeit or falsify, thereby making biometric authentication highly secure. Different forms of biometric information may be readily acquired using one or more biometric sensor(s) provided by an electronic device, such as a mobile phone. However, many electronic devices either do not include biometric sensor(s) or are not physically, commercially and/or functionally susceptible to the incorporation of biometric sensor(s). Such electronic devices are not able to provide biometric authentication.

SUMMARY

The inventive concept relates to a portable biometric authentication device and a terminal device and provides a portable biometric authentication device for providing biometric information via near field communication (NFC) and a terminal device for providing power to the portable biometric authentication device via the NFC.

According to an aspect of the inventive concept, there is provided a portable biometric authentication device that communicates with a terminal device using near field communication (NFC). The portable biometric authentication device includes; a NFC antenna, a power supply circuit that generates at least one power voltage in response to an electromagnetic field generated by the terminal device and received via the NFC antenna, a sensor subsystem that operates in response to the at least one power voltage and includes a biometric sensor that acquires biometric information from a user, and a control subsystem that operates in response to the at least one power voltage and includes a NFC controller that controls the communication of the biometric information to the terminal device using the NFC antenna.

According to another aspect of the inventive concept, there is provided a terminal device configured to communicate with a portable biometric authentication device using near field communication (NFC). The terminal device includes a first NFC antenna, a NFC subsystem configured to generate an electromagnetic field using the first NFC antenna, such that the portable biometric authentication device operates in response to at least one power voltage generated by the portable biometric authentication device in response to an electrical current induced in a second NFC antenna of the portable biometric authentication device by the electromagnetic field, and a personal authentication unit configured to perform personal authentication for a user of the portable biometric authentication in response to biometric information provided by the user to the portable biometric authentication device.

According to an aspect of the inventive concept, there is provided a method of operating a system including a terminal device using near field communication (NFC) to communicate with a portable biometric authentication device. The method includes; powering operation of the portable biometric authentication device solely from an electromagnetic field generated by the terminal device, generating a request for biometric information of a user of the portable biometric authentication device in the terminal device, generating first biometric information from a fingerprint image provided by the user to a fingerprint sensor disposed in the portable biometric authentication device, communicating the first biometric information from the portable biometric authentication device to the terminal device using the NFC, and performing personal authentication of the user in the terminal device in response to the first biometric information.

BRIEF DESCRIPTION OF THE DRAWINGS

Embodiments of the inventive concept will be more clearly understood from the following detailed description taken in conjunction with the accompanying drawings in which.

DETAILED DESCRIPTION

The term "near field communication" (or "NFC") is used to describe a broad class of technology enabling two or more electronic devices to communicate one or more electromagnetic signal(s) without necessarily mandating a constituent mechanical connection or physical connection (or touching) of the electronic devices. Various approaches to NFC establish a set of corresponding communication protocols that enable one-way or two-way communication (i.e., transmission and/or reception) of signal(s) between multiple electronic devices. In certain NFC approaches, a first electronic device generates an electromagnetic field, and when a second electronic devices comes into proximity with the electromagnetic field, an electrical signal is induced such that information may be wirelessly communicated between the first electronic device and second electronic device.

In certain contemporary approaches, NFC information (or data) may be wirelessly communicated across a distance of up to about 10 cm. Data communicated using NFC may be used by a user of an electronic device to make a payment, access an account, gain access to a product or place, etc. There are a number of publicly available technical standards (or specifications) that define different NFC approaches. For example, the International Organization for Standards (ISO) and International Electro-technical Commission (IEC) ISO/IEC 21481 specifies a communication protocol, a data exchange format, signal frequencies and bandwidths (e.g., 13.56 MHz), etc., enabling NFC between electronic devices.

NFC may be used to communicate not only information or data bearing signal(s), but also power signal(s). That is, a first electronic device (the "initiator") may generate an electromagnetic field, and a second electronic device (the "target") may extract power from the electromagnetic field generated by the initiator device sufficient to operate the target device. For example, some target devices may extract an electrical current of up to about 50 mA from an electromagnetic field generated by an initiator device.

Figure 1:
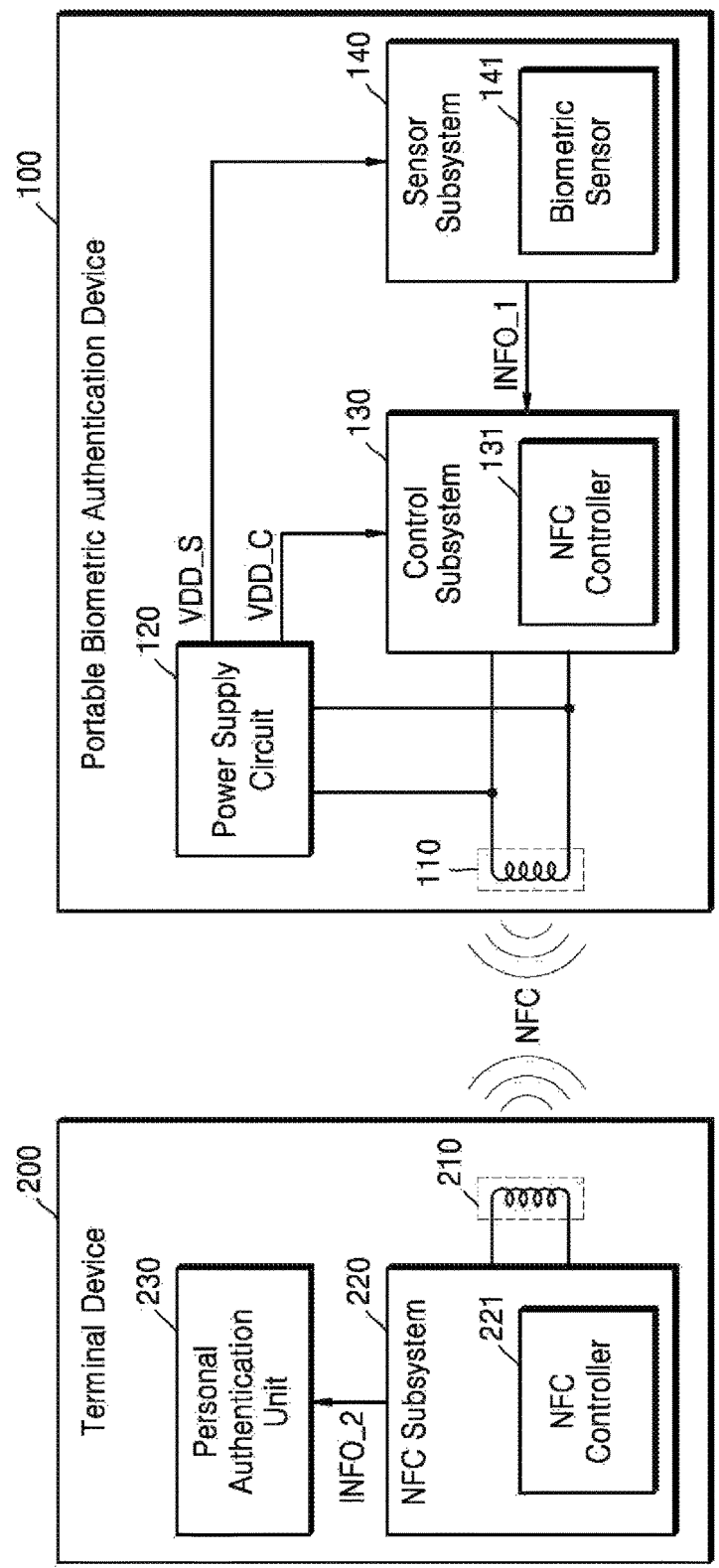
FIG. 1 is a block diagram of a portable biometric authentication device and a terminal device according to an exemplary embodiment.

FIG. 1 is a block diagram of a portable biometric authentication device 100 and a terminal device 200 according to an embodiment of the inventive concept. The portable biometric authentication device 100 and terminal device 200 communication information using NFC. Here, the portable biometric authentication device 100 may be used to acquire biometric information associated with a user and provide the acquired biometric information to the terminal device 200. The terminal device 200 may then perform personal authentication using (or based on) the provided biometric information. Additionally or alternatively, the terminal device 200 may provide power to the portable biometric authentication device 100 using NFC, such that the portable biometric authentication device 100 may acquire biometric information, communicate acquired biometric information to the terminal device 200, or perform some other function.

Referring to FIG. 1, the portable biometric authentication device 100 may include a NFC antenna 110, a power supply circuit 120, a control subsystem 130, and a sensor subsystem 140. The NFC antenna 110 may be used to (1) generate an electromagnetic field according to signals received from the control subsystem 130 (e.g., a NFC controller 131 in the control subsystem 130) and (2) receive an electromagnetic field generated by the terminal device 200 and provide one or more corresponding electrical signals induced in the NFC antenna 110 by the received electromagnetic field. The NFC antenna 110 may be an antenna module including passive elements where the nature and arrangement of the passive elements may be determined by one or more resonance frequencies defined by an appropriate NFC protocol governing the operation of the terminal device 200 and/or portable biometric authentication device 100.

In the portable biometric authentication device 100, the power supply circuit 120 may be connected to the NFC antenna 110 and may generate one or more power signals from the electrical signal(s) induced by an electromagnetic field proximate to the NFC antenna 110. For example, the power supply circuit 120 may extract an electrical current induced in the NFC 110 by the electromagnetic field and generate at least one power voltage based on the extracted electrical current. In the illustrated example of FIG. 1, the power supply circuit 120 is assumed to provide a first power voltage VDD_C to the control subsystem 130 and a second power voltage VDD_S to the sensor subsystem 140. The control subsystem 130 and the sensor subsystem 140 may respectively operate in response to the first and second power voltages VDD_C and VDD_S provided by the power supply circuit 120.

Here, it should be noted that the example of FIG. 1 shows different power voltages being provided to the control subsystem 130 and sensor subsystem 140 from the power supply circuit 120. However, in other embodiments of the inventive concept, identical power voltage(s) may be provided by the power supply circuit 120 to the control subsystem 130 and sensor subsystem 140.

As previously noted, the control subsystem 130 of FIG. 1 is assumed to include the NFC controller 131, where the NFC controller 131 may be used in the portable biometric authentication device 100 to control the communication of data via the NFC antenna 110. For example, the NFC controller 131 may be used to control the reception of a biometric information request received from the terminal device 200 and/or the transmission of (first) biometric information INFO_1 provided by the sensor subsystem 140 to the terminal device 200 in response to the biometric information request. In FIG. 1, the NFC controller 131 is assumed to operate in response to the first power voltage VDD_C provided by the power supply circuit 120.

The sensor subsystem 140 may include a biometric sensor 141 that is capable of providing the first biometric information INFO_1 to the control subsystem 130. The biometric sensor 141 may acquire the biometric information from the user (e.g., a fingerprint image, an iris image, a finger vein pattern, voice pattern, or the like) and then convert the biometric information into corresponding electrical signal(s). In FIG. 1, the biometric sensor 141 is assumed to operate in response to the second power voltage VDD_S provided by the power supply circuit 120.

Thus, from the foregoing it will be understood that the control subsystem 130 and sensor subsystem 140 included in the portable biometric authentication device 100 may be operated using one or more power signals (e.g., power voltages) generated by the power supply circuit 120 in response to at least one electrical signal induced in the NFC antenna 110 by an electromagnetic field generated by the terminal device 200. Accordingly, the portable biometric authentication device 100 need not include a battery or equivalent internal power source, yet need not be externally connected to a power terminal in order to operate. This feature allows the portable biometric authentication device 100 to be relatively simple in its design and structure. Further it may be provided (e.g., manufactured, fabricated and/or physically provisioned) with a relatively small form factor. Here, the term "small" refers to one or more physical dimensions (e.g., height, width, length, thickness, area, volume, etc.) of the portable biometric authentication device 100.

Due to its relatively simple structure and small form factor, the portable biometric authentication device 100 may be provided in a variety of user-friendly forms. For example, as will be described in relation to FIG. 2, the portable biometric authentication device 100 may be embedded within a cover or case of the terminal device 200. Alternately, as will be described in relation to FIG. 16, the portable biometric authentication device 100 may be embedded within a convenient card (e.g., a credit card like form). As a result, the portable biometric authentication device 100 may provide considerable convenience to a user while at the same time ensuring a high degree of information accuracy and security.

The terminal device 200 may be an electronic device capable of performing personal authentication by communicating with the portable biometric authentication device 100 using NFC. In various embodiments, the terminal device 200 may be a desktop computer, a server system, a smart TV, an electric gate, a point of sale (POS) system, or the like. The terminal device 200 may be a portable electronic device such as a laptop computer, a tablet PC, a mobile phone, a smart phone, an e-reader, a personal digital assistant (PDA), an enterprise digital assistant (EDA), a digital still camera, a digital video camera, a portable multimedia player (PMP), a personal or portable navigation device (PND), a handheld game console, or the like.

Referring to FIG. 1, the terminal device 200 may include a NFC antenna 210, a NFC subsystem 220, and a personal authentication unit 230. The NFC antenna 210 may be used to generate an electromagnetic field according to signals received from the NFC subsystem 220 (e.g., a NFC controller 221) or generate one or more electrical signals in response to an electromagnetic field generated by the portable biometric authentication device 100. Similar to the NFC antenna 110 of the portable biometric authentication device 100, the NFC antenna 210 may be an antenna module including passive elements where the number and arrangement of passive elements may determined by one or more resonance frequencies of the NFC antenna 210.

The NFC subsystem 220 may include the NFC controller 221, and the NFC controller 221 may control the NFC communication of data via the NFC antenna 210. For example, the NFC controller 221 may communicate a biometric information request to the portable biometric authentication device 100 and/or receive biometric information from the portable biometric authentication device 100 via the NFC antenna 210. The NFC controller 221 may control the NFC antenna 210 such that power sufficient to operate the portable biometric authentication device 100 is provided to the portable biometric authentication device 100 by the electromagnetic field generated via the NFC antenna 210.

The personal authentication unit 230 may receive (second) biometric information INFO_2 from the NFC subsystem 220 and may perform personal authentication based on the biometric information INFO_2. For example, the personal authentication unit 230 may determine (e.g., compare) whether the second biometric information INFO_2 provided by the NFC subsystem 220 corresponds with expected (e.g., previously registered or predetermined) biometric information associated with the user during personal authentication. In various embodiments of the inventive concept, the personal authentication unit 230 may be implemented as hardware logic operating in accordance with a state machine or as a processor executing a program stored in a memory accessible to the terminal device 230.

Figure 2:
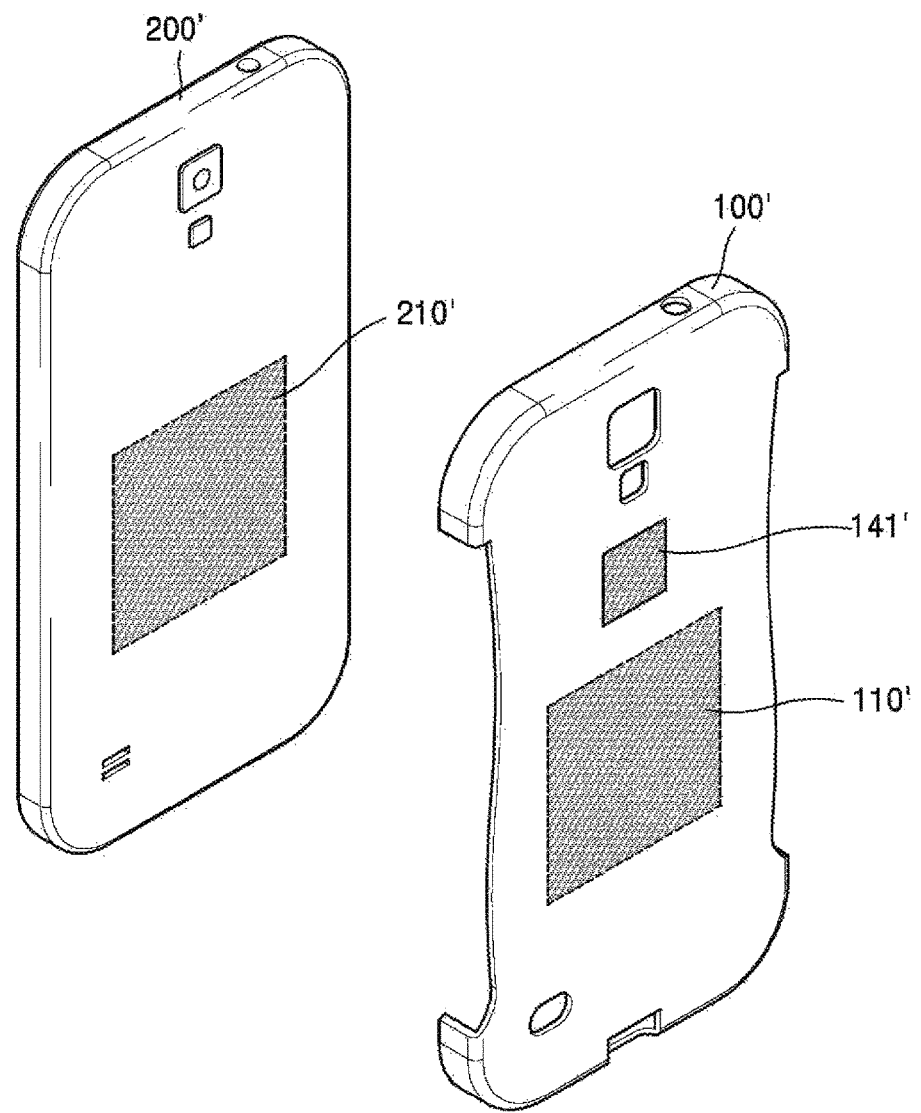
FIG. 2 is diagrams of respective examples of the portable biometric authentication device and the terminal device of FIG. 1 according to an exemplary embodiment.

FIG. 2 is a conceptual diagram illustrating respective physical implementations of the portable biometric authentication device 100 and terminal device 200 of FIG. 1 according to an embodiment of the inventive concept. That is, FIG. 2 shows a rear (or back) surface of a mobile phone 200' and a mobile phone case 100' that is mechanically attachable/detachable to the rear surface of the mobile phone 200'. Here, the mobile phone case 100' may include a first primary surface configured to receive and attach the mobile phone 200' and an opposing second primary surface exposing a NFC antenna 110' and a biometric sensor 141'. That is, each of these two elements is externally exposed or accessible without removing the mobile phone 200' from the mobile phone case 100'. The NFC antenna 110' may be embedded in the mobile phone case 110' such that the NFC antenna 110' may be positioned to face a NFC antenna 210' embedded in the mobile phone 200' when the mobile phone case 100' is attached to the mobile phone 200'. The biometric sensor 141' may be provided in a surface opposite to the surface of mobile phone case 100' facing the mobile phone 200', such that the biometric sensor 141' is externally exposed when the mobile phone case 100' is attached to the mobile phone 200'. In this manner, the biometric sensor 141' may readily acquire biometric information from the user, such that the biometric information may be communicated to the mobile phone 200' via the NFC antenna 110'.

The mobile phone 200' may include the NFC antenna 210' and may perform personal authentication for the user based on the biometric information received via the NFC antenna 210'. For example, the mobile phone 200' may access a bank server via a wireless communication network once personal authentication has been successfully performed and thus may provide access to certain banking function(s) by the authenticated user. The mobile phone 200' may drive the NFC antenna 210' to provide a NFC controller (not shown in FIG. 2), the biometric sensor 141', or the like included in the mobile phone case 100' with sufficient operating power.

Thus, as described above with reference to FIG. 1, the portable biometric authentication device 100 of FIG. 1 need not include a battery or power terminal connection in order to connect and operate the portable biometric authentication device 100 with the terminal device 200. And as shown in FIG. 2, the portable biometric authentication device 100 may be embodied as the mobile phone case 100' which is a desirable accessory for the mobile phone 200'. The mobile phone case 100' may allow the mobile phone 200', which does not include a biometric sensor, to perform personal authentication based on biometric information obtained from a user.

Figure 3:
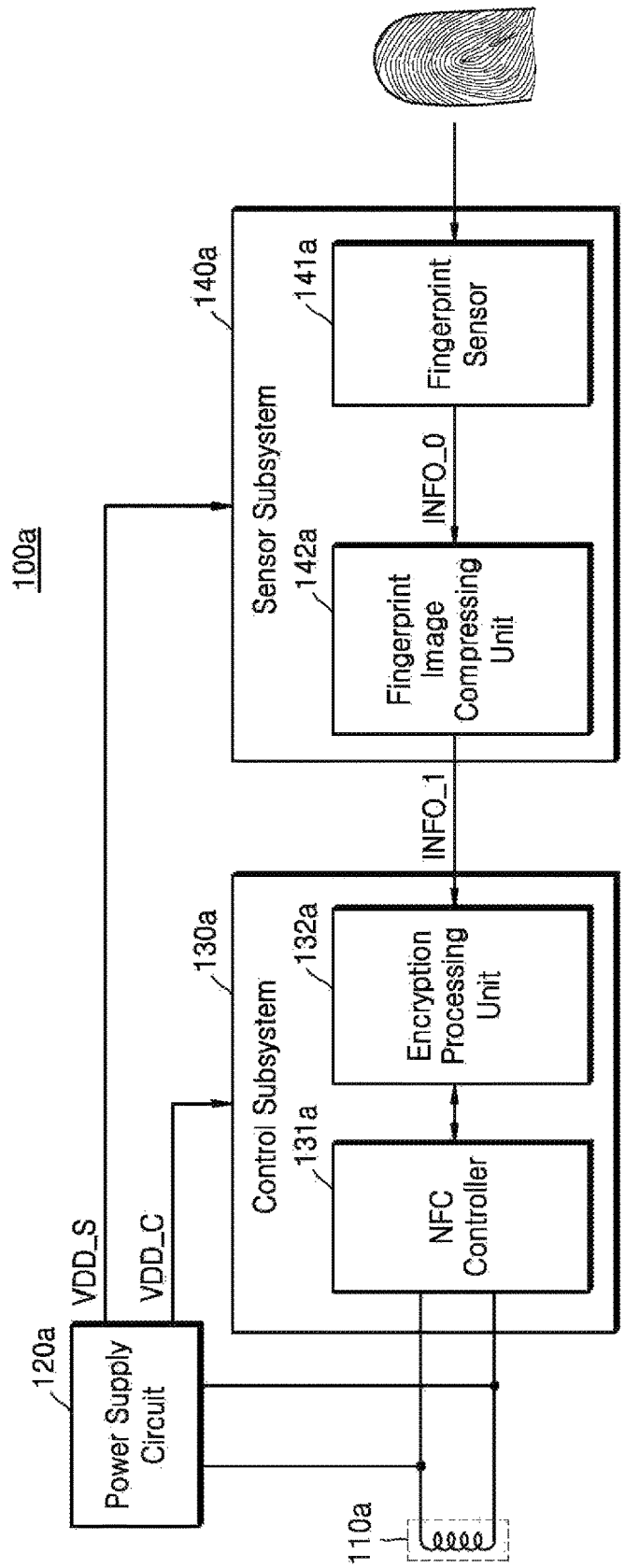
FIG. 3 is a block diagram of a portable biometric authentication device according to an exemplary embodiment.
Figure 4:
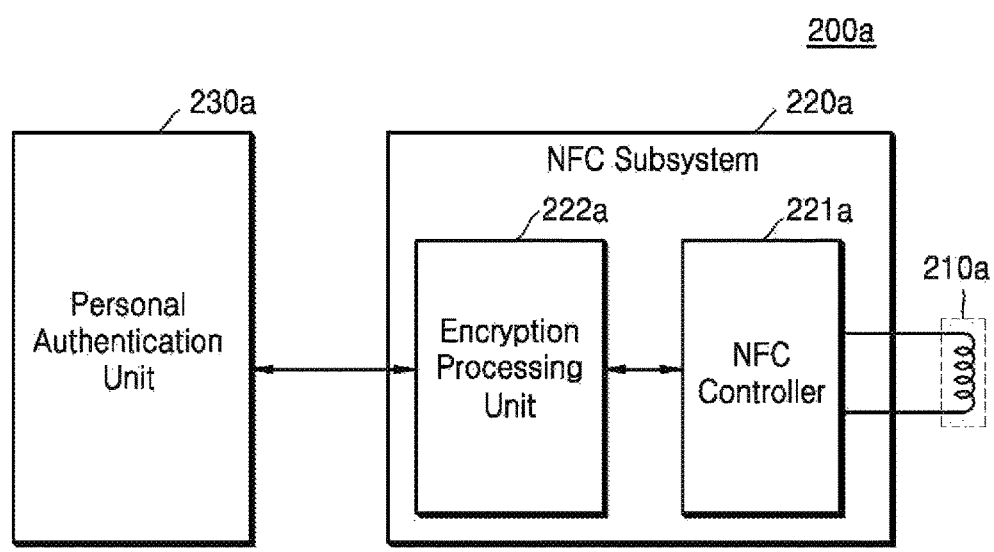
FIG. 4 is a block diagram of a terminal device according to an exemplary embodiment.

FIG. 3 is a block diagram further illustrating in one example a portable biometric authentication device 100a according to an embodiment of the inventive concept. FIG. 4 is a block diagram further illustrating in one example a terminal device 200a according to an embodiment of the inventive concept. Here, the portable biometric authentication device 100a of FIG. 3 is assumed to acquire a fingerprint image of the user as biometric information. Further, the terminal device 200a of FIG. 4 is assumed to perform personal authentication based on the acquired fingerprint image. Hereinafter, a fingerprint image is used as one example of possible biometric information, but those skilled in the art will understand that one or more other types of biometric information may be substituted for described fingerprint image.

Referring to FIG. 3, the portable biometric authentication device 100a may include a NFC antenna 110a, a power supply circuit 120a, a control subsystem 130a, and a sensor subsystem 140a. The NFC antenna 110a and the power supply circuit 120a may perform the same or similar functions as or to the NFC antenna 110 and the power supply circuit 120 of FIG. 1.

Referring to FIG. 3, the sensor subsystem 140a is assumed to include a fingerprint sensor 141a and a fingerprint image compressing unit 142a. The fingerprint sensor 141a and the fingerprint image compressing unit 142a may operate based on the second power voltage VDD_S provided by the power supply circuit 120a to the sensor subsystem 140a.

As shown in FIG. 3, the fingerprint sensor 141a may acquire and detect a fingerprint image provided by the user and correspondingly output one or more fingerprint images INFO_0 as electrical signal(s). In the illustrated example of FIG. 3, the electrical signal(s) corresponding to the provided fingerprint image are processed by the fingerprint sensor 141a to (e.g.,) generate multiple, corresponding image pixels and generate output signals from the image pixels (e.g., the fingerprint images INFO_0).

According to an embodiment illustrated in FIG. 3, the fingerprint images INFO_0 provided by the fingerprint sensor 141a may be compressed by the fingerprint image compressing unit 142a. That is, fingerprint images INFO_1 provided by the sensor subsystem 140a to the control subsystem 130a may be compressed data. The fingerprint sensor 141a may detect the fingerprint of the user a number of times during a given cycle and provide one or more fingerprint images INFO_0 as the result of each cycle. The speed with which the fingerprint sensor 141a provides the fingerprint images INFO_0 is an important factor in determining the speed with which biometric information is provided by the portable biometric authentication device 100a to the terminal device 200a. Therefore, the fingerprint image compressing unit 142a may efficiently provide the first biometric information INFO_1 (e.g., compressed fingerprint images INFO_0) in response to the operation of the fingerprint sensor 141a. For example, the fingerprint image compressing unit 142a may select one or more of the fingerprint images INFO_1 and provide the selected fingerprint images for further processing by the fingerprint image compressing unit 142a in order to generate high-quality biometric information INFO_1 from two or more fingerprint images INFO_0.

Referring to FIG. 3, the control system 130a may include a NFC controller 131a and an encryption processing unit 132a. The NFC controller 131a and encryption processing unit 132a may operate in response to the first power voltage VDD_C provided from the power supply circuit 120a to the control subsystem 130a. The NFC controller 131a may perform the same or similar functions as or to the NFC controller 131 of FIG. 1.

According to an exemplary embodiment, the first biometric information communicated by the portable biometric authentication device 100a to the terminal device 200a via the NFC may be encrypted prior to transmission. That is, the encryption processing unit 132a may encrypt the first biometric information INFO_1 provided by the sensor subsystem 140a (e.g., the fingerprint image compressing unit 142a). Security of the fingerprint image(s) INFO_0 used during personal authentication must be maintained throughout the processes of acquiring, processing and most particularly during the transmission of the biometric information by the portable biometric authentication device 100a. Therefore, the encryption processing unit 132a may be used to maintain the security of the biometric information INFO_1 (and the underlying fingerprint image(s) INFO_0) during transmission of the biometric information INFO_1 to the terminal device 200a using NFC. Thus, in certain embodiments of the inventive concept, the first biometric information INFO_1 communicated by the portable biometric authentication device 100a may be encrypted data. As a result, the terminal device 200a will include the components necessary to exchange encrypted data with the portable biometric authentication device 100a. Hence, the encryption processing unit 132a of FIG. 3 may be used to encrypt the first biometric information generated by the portable biometric authentication device 100a. A more detailed explanation of possible operations associated with the encryption processing unit 132a of FIG. 3 will be described with reference to FIGS. 6 and 7 hereafter.

Referring to FIG. 4, the terminal device 200a may include a NFC antenna 210a, a NFC subsystem 220a, and a personal authentication unit 230a. The NFC antenna 210a and personal authentication unit 230a may perform the same or similar functions as or to the NFC antenna 210 and the personal authentication unit 230 of FIG. 1. The NFC subsystem 220a may include a NFC controller 221a and an encryption processing unit 222a. The NFC controller 221a may perform the same or similar functions as or to the NFC controller 221 of FIG. 1.

The encryption processing unit 222a may be used to decrypt the encrypted first biometric information received from the portable biometric authentication device 100a using NFC. As described with reference to FIG. 3, the encryption processing unit 132a of the portable biometric authentication device 100a may generate an encrypted, compressed, fingerprint image as the first biometric information INFO_1 that is communicated via an electromagnetic field generated by the NFC antenna 110a. The encryption processing unit 222a of the terminal device 200a may be used to decrypt the encrypted biometric information in order to generate corresponding second biometric information INFO_2 that is provided to the personal authentication unit 230a. The encryption processing unit 222a may also be used to encrypt data (e.g., a biometric information request) communicated to the portable biometric authentication device 100a using NFC. A more detailed description of possible operations of the encryption processing unit 222a will be described with reference to FIGS. 6 and 7 hereafter.

The encryption processing unit 132a of the portable biometric authentication device 100a and the encryption processing unit 222a of the terminal device 200a may be respectively implemented as an embedded secure element (eSE) indicating that an SE, which denotes an area including an element for safely storing or processing data, for example, financial information, authentication information, a service application, etc., which needs to be secured, is embedded in a semiconductor chip. For example, the encryption processing unit 132a and the NFC controller 131a of the portable biometric authentication device 100a may be embedded in one semiconductor chip, and the encryption processing unit 222a and the NFC controller 221a of the terminal device 200a may be embedded in one semiconductor chip.

Figure 5:
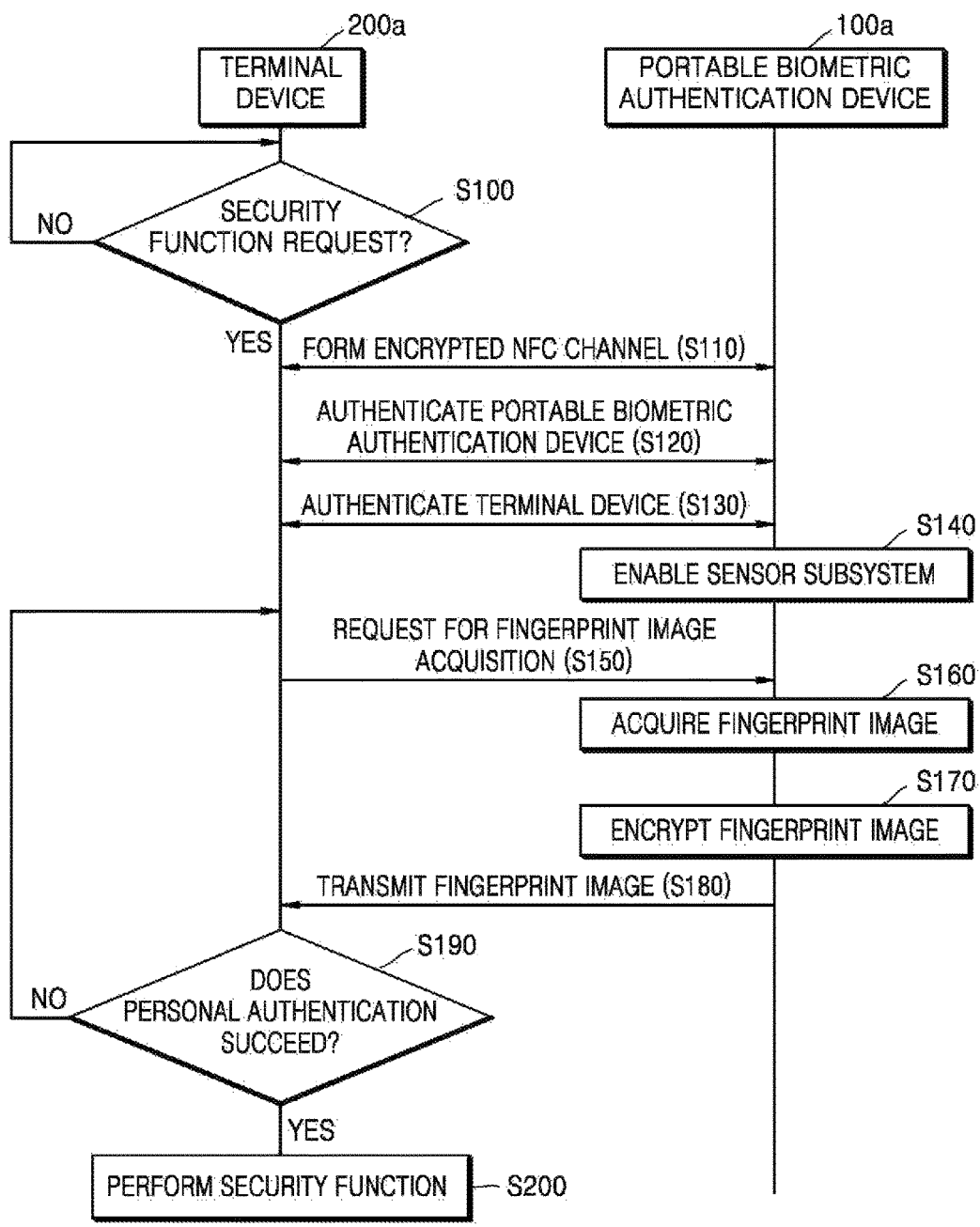
FIG. 5 is a flowchart of operations performed between the portable biometric authentication device and the terminal device of FIGS. 3 and 4, according to an exemplary embodiment.

FIG. 5 is a flowchart describing the interoperation between the portable biometric authentication device 100a and terminal device 200a of FIGS. 3 and 4 according to certain embodiments of the inventive concept. FIG. 5 shows a temporal flow of operations performed between the portable biometric authentication device 100a and the terminal device 200a such that the terminal device 200a receives a security function request and a security function is enabled. Hereinafter, the operations of FIG. 5 will be described with reference to FIGS. 3 and 4.

In operation S100, the terminal device 200a may check whether the security function request is received. The security function may be an operation that requires personal authentication and may include, for example, a payment function, a banking function, etc. The terminal device 200a may receive the security function request from the user.

In operation S110, the terminal device 200a and the portable biometric authentication device 100a may perform an operation of forming an encrypted NFC channel. As the encrypted NFC channel is formed, security of data exchanged between the terminal device 200a and the portable biometric authentication device 100a may be maintained. A detailed description of operation S110 will be provided with reference to FIG. 6 hereafter.

In operation S120, the terminal device 200a and the portable biometric authentication device 100a may perform an operation of authenticating the portable biometric authentication device 100a. Then, in operation S130, the terminal device 200a and the portable biometric authentication device 100a may perform an operation of authenticating the terminal device 200a. Through the operation of authenticating the terminal device 200a and the portable biometric authentication device 100a, security of the personal authentication using the portable biometric authentication device 100a may be reinforced. Detailed descriptions of operations S120 and S130 will be provided with reference to FIGS. 8 and 9 hereafter.

In operation S140, the portable biometric authentication device 100a may perform an operation of enabling the sensor subsystem 140a. For example, the NFC controller 131a may enable the sensor subsystem 140a when the terminal device 200a is successfully authenticated in operation S130. The NFC controller 131a may, for example, control the power supply circuit 120a to provide the second power voltage VDD_S to the sensor subsystem 140a or may inactivate an enable input signal of the sensor subsystem 140a.

In operation S150, the terminal device 200a may request the portable biometric authentication device 100a to acquire biometric information (e.g., a fingerprint image). In operation S160, the portable biometric authentication device 100a (e.g., the fingerprint sensor 141a) may acquire the fingerprint image from a fingerprint of the user. In operation S170, the portable biometric authentication device 100a (e.g., the encryption processing unit 132a) may encrypt the acquired fingerprint image. In operation S180, the portable biometric authentication device 100a (e.g., the NFC controller 131a) may transmit the encrypted fingerprint image to the terminal device 200a.

In operation S190, the terminal device 200a may determine whether the personal authentication succeeds. For example, the terminal device 200a (e.g., the encryption processing unit 222a) may decrypt the encrypted fingerprint image received from the portable biometric authentication device 100a. Then, the terminal device 200a (e.g., the personal authentication unit 230a) may compare the decrypted fingerprint image with a known (e.g., registered or vetted) fingerprint image associated with the user. If the decrypted fingerprint image is different from the registered fingerprint image for the user, the terminal device 200a may re-request that the portable biometric authentication device 100a acquire a fingerprint image. On the other hand, if the decrypted fingerprint image is the same as the registered fingerprint image for the user, the terminal device 200a may perform the security function in operation S200.

Figure 6:
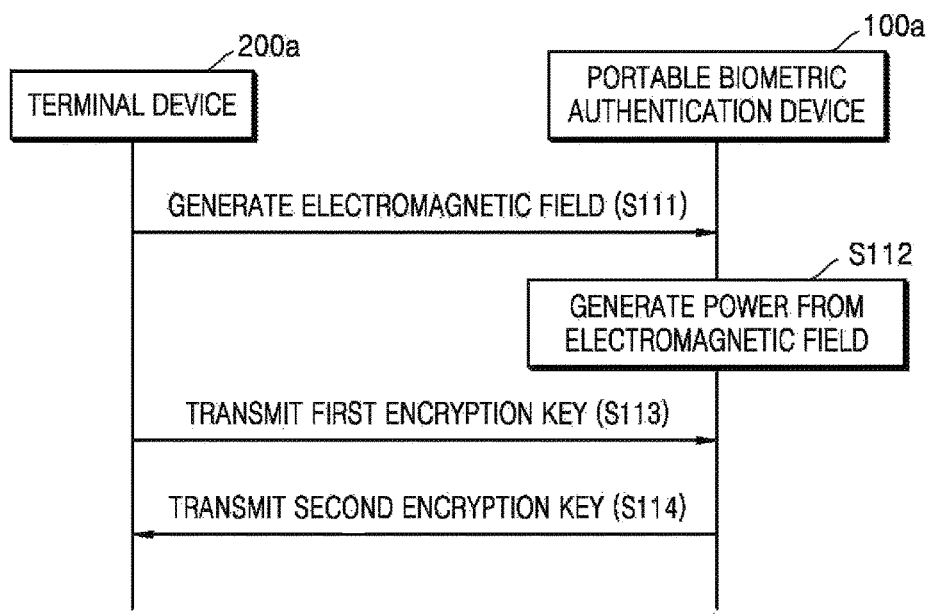
FIG. 6 is a flowchart of an example of operation S110 of FIG. 5, according to an exemplary embodiment.

FIG. 6 is a flowchart further illustrating in one example the operation S110 of FIG. 5 according to an exemplary embodiment. As described with reference to FIG. 5, the terminal device 200a and the portable biometric authentication device 100a may perform the operation of forming the encrypted NFC channel in operation S110.

Referring to FIG. 6, in operation S111, the terminal device 200a may generate an electromagnetic field. That is, the terminal device 200a, as the initiator device of the NFC, may generate a carrier field. For example, the NFC controller 221a may control the NFC antenna 210a such that the NFC antenna 210a generates the electromagnetic field.

In operation S112, the portable biometric authentication device 100a may generate one or more power signals from the received electromagnetic field. For example, the power supply circuit 120a may generate one or more power voltage(s) from an electrical current induced in the NFC antenna 110a by the electromagnetic field generated by the NFC antenna 210a of the terminal device 200a. The power generated by the power supply circuit 120a may be provided to components of the portable biometric authentication device 100a, for example, the control subsystem 130a and the sensor subsystem 140a, respectively.

In operation S113, the terminal device 200a may transmit a first encryption key to the portable biometric authentication device 100a, and in operation S114, the portable biometric authentication device 100a may transmit a second encryption key to the terminal device 200a. The first encryption key may be used to encrypt biometric information (e.g., a fingerprint image) transmitted by the portable biometric authentication device 100a to the terminal device 200a. The second encryption key may be used to encrypt data (e.g., a fingerprint image acquisition request, binary data, magnetic stripe data, etc.) transmitted by the terminal device 200a to the portable biometric authentication device 100a. Detailed descriptions regarding reception/transmission of encrypted data will be provided with reference to FIG. 7. The encrypted NFC channel may be formed between the terminal device 200a and the portable biometric authentication device 100a through operations, that is, operations S111 to S114.

Figure 7:
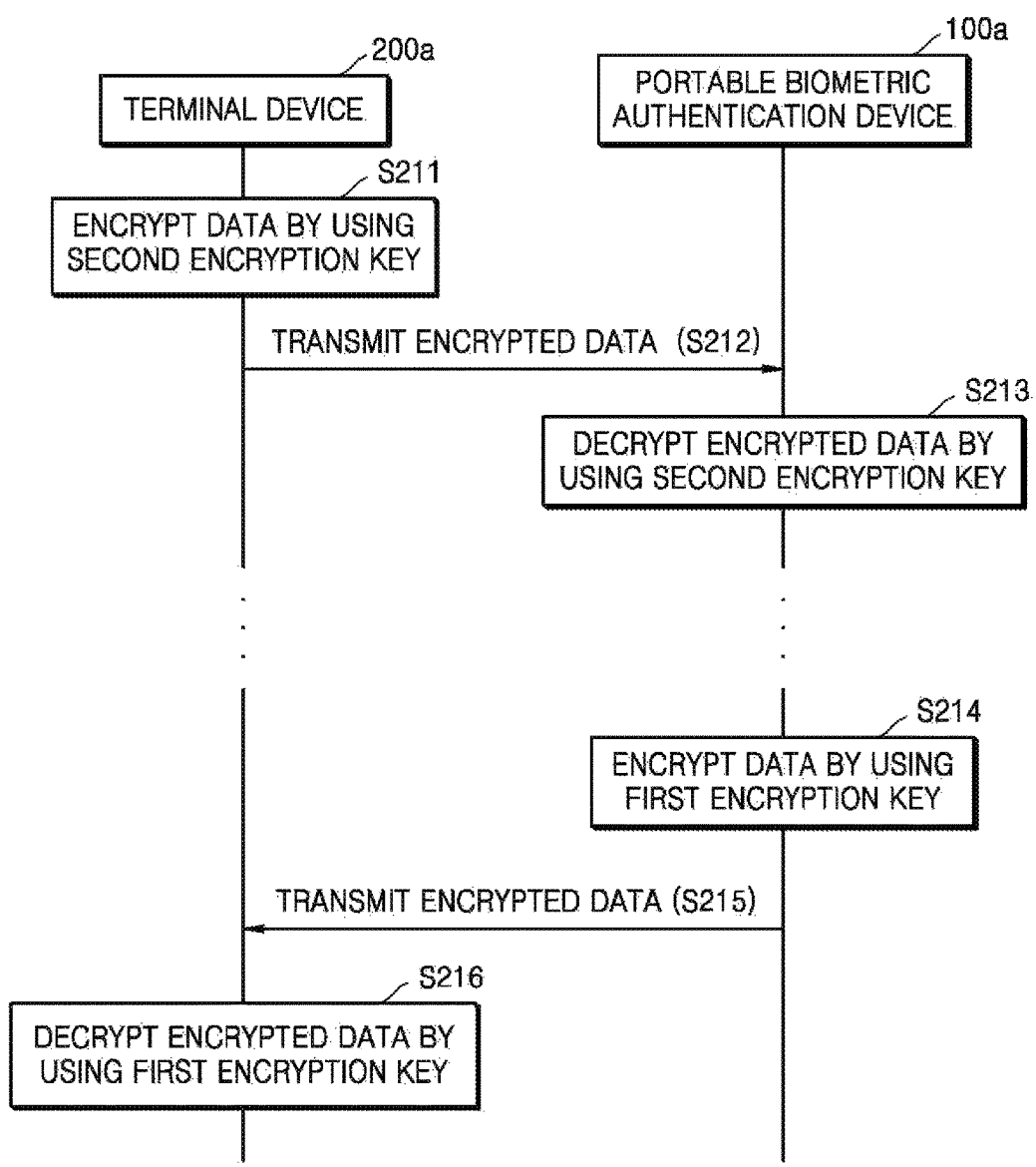
FIG. 7 is a flowchart of an operation of receiving/transmitting data by a terminal device and a portable biometric authentication device in an encrypted near field communication (NFC) channel, according to an exemplary embodiment.

FIG. 7 is a flowchart describing in one example the operations of receiving/transmitting data between the terminal device 200a and portable biometric authentication device 100a using an encrypted NFC channel according to an exemplary embodiment. FIG. 7 shows the operation of receiving/transmitting encrypted data by the terminal device 200a and the portable biometric authentication device 100a when the encrypted NFC channel is formed. Operations S211 to S213 show the transmission of the data from the terminal device 200a to the portable biometric authentication device 100a, and operations S214 to S16 show the transmission of the data from the portable biometric authentication device 100a to the terminal device 200a.

Referring to FIG. 7, in operation S211, the terminal device 200a may encrypt the data by using the second encryption key. For example, the encryption processing unit 222a of the terminal device 200a may encrypt the data (e.g., a fingerprint image acquisition request, binary data, magnetic stripe data, etc.) by using the second encryption key.

In operation S212, the terminal device 200a may transmit the encrypted data to the portable biometric authentication device 100a. For example, the NFC controller 221a of the terminal device 200a may receive the encrypted data from the encryption processing unit 222a and may transmit the encrypted data to the portable biometric authentication device 100a by controlling the NFC antenna 210a based on the encrypted data.

In operation S213, the portable biometric authentication device 100a may decrypt the encrypted data by using the second encryption key. For example, the NFC controller 131a of the portable biometric authentication device 100a may transmit the encrypted data, which is received via the NFC antenna 110a, to the encryption processing unit 132a, and the encryption processing unit 132a may decrypt the encrypted data by using the second encryption key.

In operation S214, the portable biometric authentication device 100a may encrypt the biometric information using the first encryption key. For example, the encryption processing unit 132a of the portable biometric authentication device 100a may encrypt the biometric information (e.g., a fingerprint image) using the first encryption key.

In operation S215, the portable biometric authentication device 100a may transmit the encrypted biometric information to the terminal device 200a. For example, the NFC controller 131a of the portable biometric authentication device 100a may receive the encrypted data from the encryption processing unit 132a and may transmit the encrypted data to the terminal device 200a by controlling the NFC antenna 110a based on the encrypted data.

In operation S216, the terminal device 200a may decrypt the encrypted biometric information using the first encryption key. For example, the NFC controller 221a of the terminal device 200a may communicate the encrypted biometric information received via the NFC antenna 210a to the encryption processing unit 222a, and the encryption processing unit 222a may decrypt the encrypted biometric information using the first encryption key.

Figure 8:
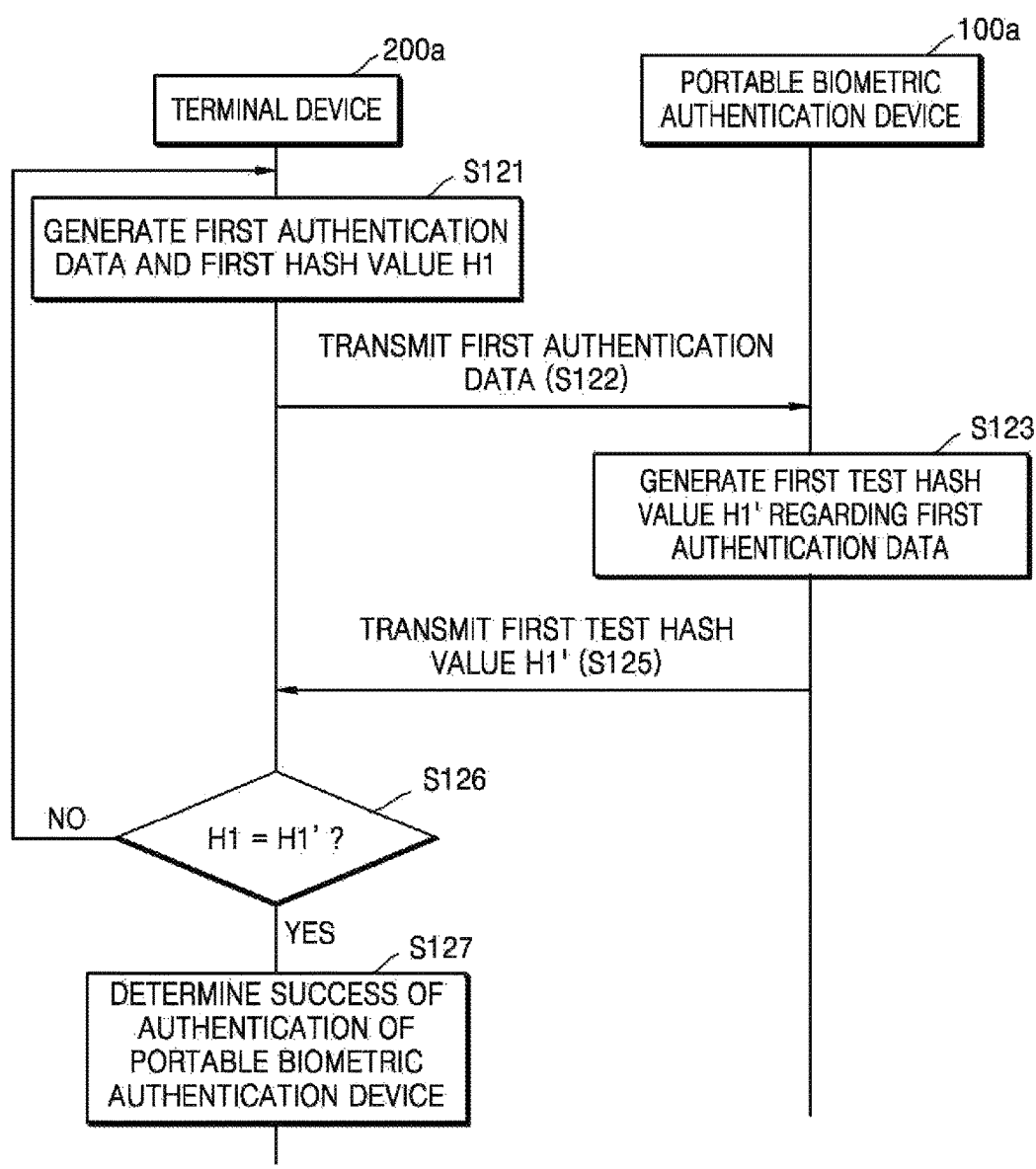
FIG. 8 is a flowchart of an example of operation S120 of FIG. 5 according to an exemplary embodiment.

FIG. 8 is a flowchart describing in one example the operation S120 of FIG. 5 according to an exemplary embodiment. As described with reference to FIG. 5, in operation S120, the terminal device 200a and the portable biometric authentication device 100a may perform the operation of authenticating the portable biometric authentication device 100a prior to the subsequent authentication of the user in response to user provided biometric information. According to an exemplary embodiment, the operation of authenticating the portable biometric authentication device 100a may be performed using the encryption processing unit 222a of the terminal device 200a in conjunction with the encryption processing unit 132a of the portable biometric authentication device 100a.

Referring to FIG. 8, in operation S121, the terminal device 200a may perform an operation of generating first authentication data and a first hash value H1. For example, the encryption processing unit 222a of the terminal device 200a may include a first hash function that is defined in advance. The encryption processing unit 222a may generate the first authentication data and may generate the first hash value H1 corresponding to the first authentication data based on the first hash function. Then, in operation S122, the terminal device 200a may transmit the first authentication data to the portable biometric authentication device 100a.

In operation S123, the portable biometric authentication device 100a may generate a first test hash value H1' regarding the first authentication data. For example, the encryption processing unit 132a of the portable biometric authentication device 100a may include a second hash function that is defined in advance and may generate the first test hash value H1' corresponding to the first authentication data received from the terminal device 200a. Then, in operation S125, the portable biometric authentication device 100a may transmit the first test hash value H1' to the terminal device 200a.

In operation S126, the terminal device 200a may perform an operation of comparing the first hash value H1 with the first test hash value H1'. When the first hash value H1 is the same as the first test hash value H1', the terminal device 200a may determine that authentication of the portable biometric authentication device 100a is successfully performed in operation S127. That is, if the first hash value H1 corresponding to the first authentication data is the same as the first test hash value H1' generated by the portable biometric authentication device 100a based on the first authentication data, then it may be determined that the first and second hash functions are the same, and then the portable biometric authentication device 100a may be authenticated. On the other hand, if the first hash value H1 is different from the first test hash value H1', the terminal device 200a may generate new first authentication data and a new first hash value H1.

Figure 9:
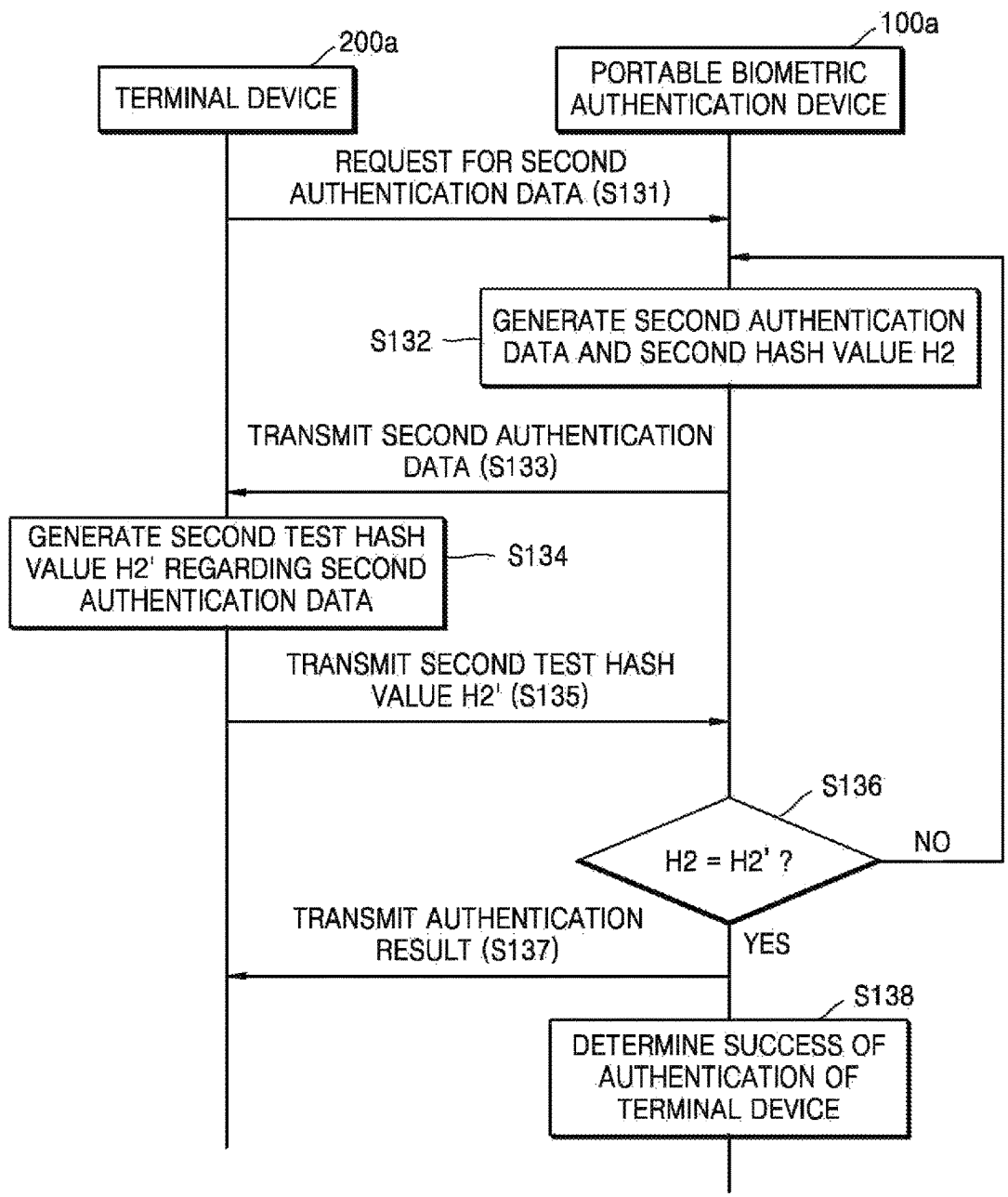
FIG. 9 is a flowchart of an example of operation S130 of FIG. 5 according to an exemplary embodiment.

FIG. 9 is a flowchart describing in one example the operation S130 of FIG. 5 according to an exemplary embodiment. As described with reference to FIG. 5, in operation S130, the terminal device 200a and the portable biometric authentication device 100a may perform an operation authenticating the terminal device 200a prior to the subsequent authentication of the user. According to an exemplary embodiment, the operation of authenticating the terminal device 200a may be performed using the encryption processing unit 222a of the terminal device 200a in conjunction with the encryption processing unit 132a of the portable biometric authentication device 100a.

Referring to FIG. 9, in operation S131, the terminal device 200a may request the portable biometric authentication device 100a to transmit second authentication data. For example, the NFC controller 221a of the terminal device 200a may control the NFC antenna 210a in response to the second authentication data request of the encryption processing unit 222a and thus may transmit a second authentication data request to the portable biometric authentication device 100a.

In operation S132, the portable biometric authentication device 100a may generate the second authentication data and a second hash value H2. For example, the encryption processing unit 132a of the portable biometric authentication device 100a may include a third hash function that is defined in advance. The encryption processing unit 132a may generate the second authentication data in response to the second authentication data request and may generate the second hash value H2 based on the third hash function. Then, in operation S113, the portable biometric authentication device 100a may transmit the second authentication data to the terminal device 200a.

In operation S134, the terminal device 200a may generate a second test hash value H2' regarding the second authentication data. For example, the encryption processing unit 222a of the terminal device 200a may include a fourth hash function that is defined in advance and may generate the second test hash value H2' corresponding to the second authentication data received from the portable biometric authentication device 100a. Then, in operation S135, the terminal device 200a may transmit the second test hash value H2' to the portable biometric authentication device 100a.

In operation S136, the portable biometric authentication device 100a may perform an operation of comparing the second hash value H2 with the second test hash value H2'. When the second hash value H2 is the same as the second test hash value H2', the portable biometric authentication device 100a may transmit an authentication result to the terminal device 200a in operation S137 and may determine that the authentication of the terminal device 200a is successfully performed in operation S128. That is, if the second hash value H2 corresponding to the second authentication data is the same as the second test hash value H2' generated by the terminal device 200a based on the second authentication data, then it may be determined that the third hash function is the same as the fourth hash function, and then the terminal device 200a may be authenticated. If the authentication of the terminal device 200a is successfully performed, the portable biometric authentication device 100a may perform a subsequent operation, for example, operation S140 of FIG. 5. On the other hand, if the second hash value H2 is different from the second test hash value H2', the portable biometric authentication device 100a may generate new second authentication data and a new second hash value H2.

Figure 10:
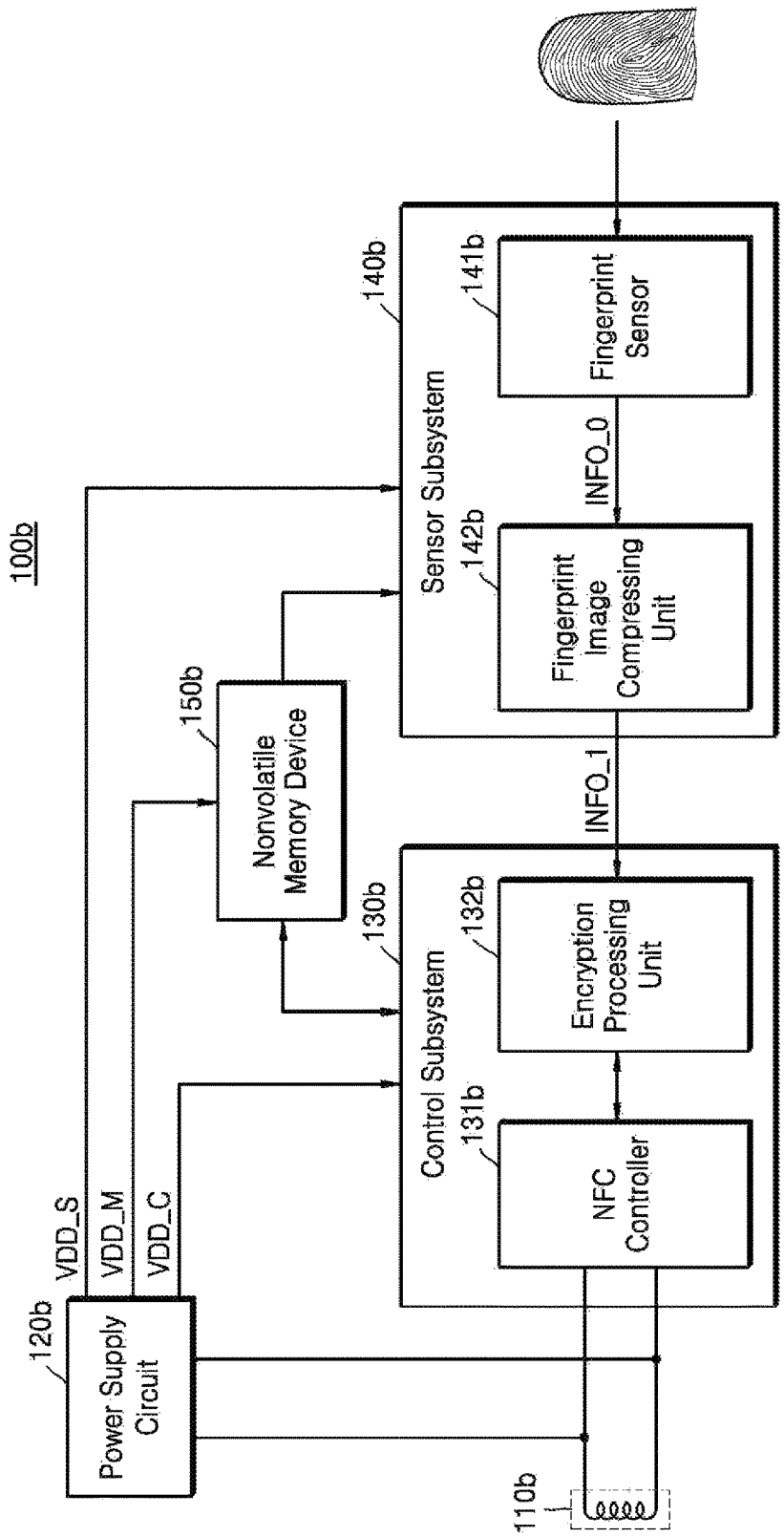
FIG. 10 is a block diagram of a portable biometric authentication device according to an exemplary embodiment.

FIG. 10 is a block diagram of a portable biometric authentication device 100b according to another embodiment of the inventive concept. The portable biometric authentication device 100b may update software or a program based on data received from a terminal device (e.g., a terminal device 200b of FIG. 11) using NFC.

Referring to FIG. 10, the portable biometric authentication device 100b may include a NFC antenna 110b, a power supply circuit 120b, a control subsystem 130b, a sensor subsystem 140b, and a non-volatile memory device 150b. The NFC antenna 110b, the power supply circuit 120b, and the sensor subsystem 140b may perform the same or similar functions as or to the NFC antenna 110a, the power supply circuit 120a, and the sensor subsystem 140a of FIG. 3.

The non-volatile memory device 150b may retain stored data even in the absence of applied power. The non-volatile memory device 150b may include an Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), Ferroelectric Random Access Memory (FRAM), or the like, but the non-volatile memory device 150b is not limited thereto.

The non-volatile memory device 150b may receive a third power voltage VDD_M from the power supply circuit 120b and may store, in a non-volatile manner, a program or a parameter that defines operations of the control subsystem 130b and/or the sensor subsystem 140b. For example, the NFC controller 131b and/or a fingerprint sensor 141b may operate based on the program or parameter stored in the non-volatile memory device 150b. The data stored in the non-volatile memory device 150b may be updated as data received via NFC, and accordingly, the operations of the control subsystem 130b and/or the sensor subsystem 140b may change. That is, software of the portable biometric authentication device 100b may be updated. Detailed descriptions regarding the update of the software of the portable biometric authentication device 100b will be provided below with reference to FIG. 11.

Although FIG. 10 shows that the portable biometric authentication device 100b includes one non-volatile memory device 150b, but the inventive concept is not limited thereto. That is, according to an exemplary embodiment, the portable biometric authentication device 100b may include two or more non-volatile memory devices to which power is applied by the power supply circuit 120b respectively, and the control subsystem 130b and the sensor subsystem 140b may respectively access different non-volatile memory devices. Also, each of the non-volatile memory devices may be updated as the data is received using NFC.

Figure 11:
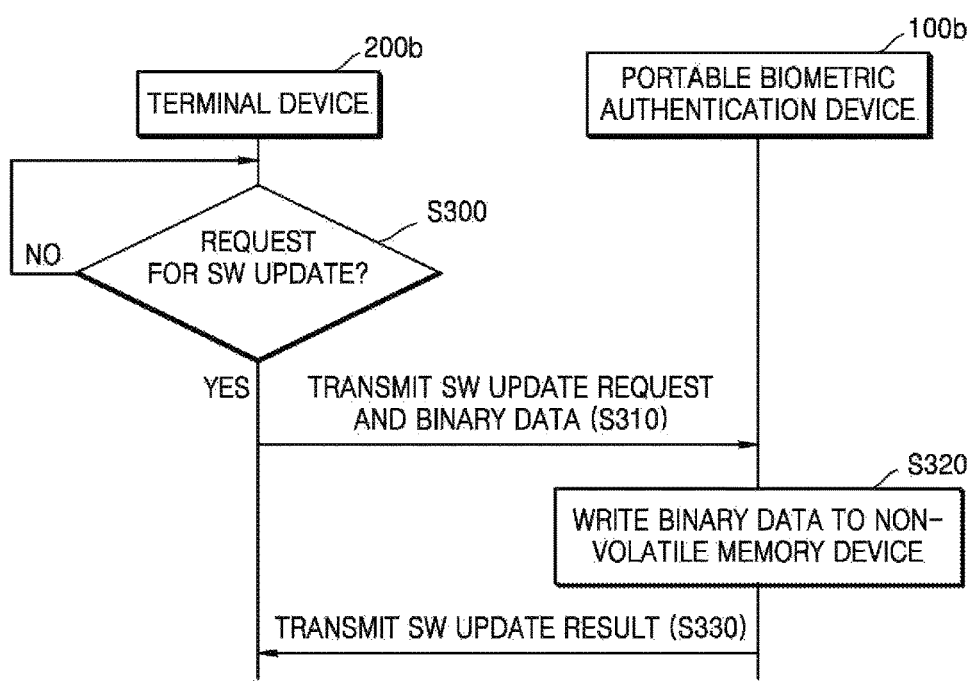
FIG. 11 is an operation of updating software by the portable biometric authentication device of FIG. 10, according to an exemplary embodiment.

FIG. 11 is a flowchart describing one possible operation of updating the software of the portable biometric authentication device 100b of FIG. 10 according to an exemplary embodiment.

In operation S300, the terminal device 200b may check whether a software (SW) update request is received. For example, the SW update request may be input to the terminal device 200b from the user or may be transmitted from a update program.

In operation S310, the terminal device 200b may transmit the SW update request and binary data to the portable biometric authentication device 100b. The binary data may correspond to a program or a parameter that defines the operations of the control subsystem 130b and/or the sensor subsystem 140b.

In operation S320, in the portable biometric authentication device 100b, an operation of writing the binary data to the non-volatile memory device 150b may be performed. For example, the NFC controller 131b may control the operation of writing the binary data to the non-volatile memory device 150b in response to a SW update request, and thus, the operations of the control subsystem 130b and/or the sensor subsystem 140b may change.

In operation S330, the portable biometric authentication device 100b may transmit a SW update result to the terminal device 200b. For example, the portable biometric authentication device 100b may transmit, to the terminal device 200b, a size of the data written to the non-volatile memory device 150b, a time taken to perform the operation of writing the data, information about errors that occur during the operation of writing the data, or the like.

Figure 12:
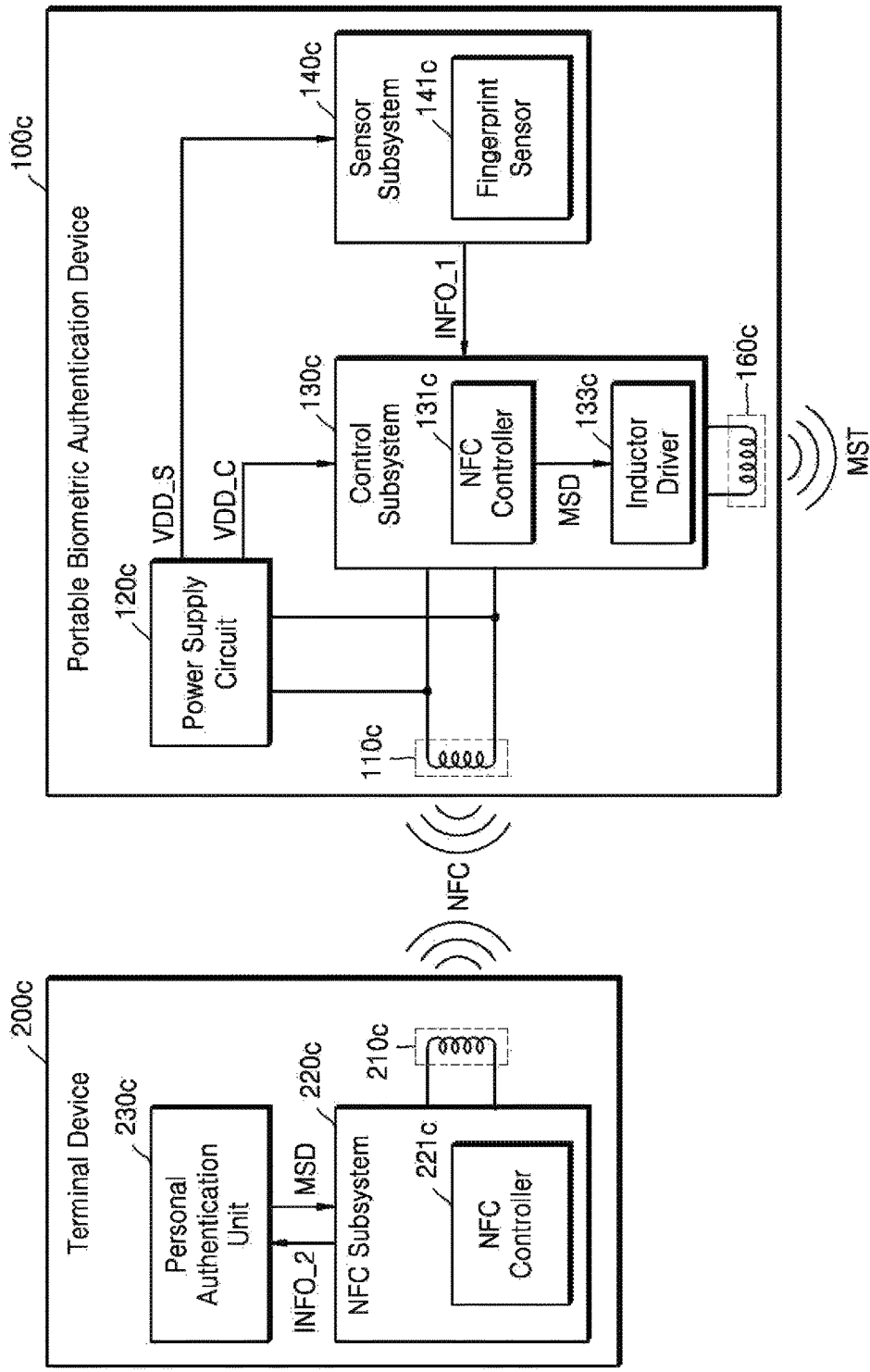
FIG. 12 is a block diagram of a portable biometric authentication device and a terminal device according to an exemplary embodiment.

FIG. 12 is a block diagram illustrating a portable biometric authentication device 100c and a terminal device 200c according to still another embodiment of the inventive concept. The portable biometric authentication device 100c may be used as a payment medium by transmitting a magnetic pulse to a card terminal based on magnetic stripe data received from the terminal device 200c, that is, by supporting magnetic stripe transmission (MST).

As shown in FIG. 12, the portable biometric authentication device 100c may include a NFC antenna 110c, a power supply circuit 120c, a control subsystem 130c, a sensor subsystem 140c, and an inductor 160c. The NFC antenna 110c, the power supply circuit 120c, the control subsystem 130c, and the sensor subsystem 140c of the portable biometric authentication device 100c may perform the same or similar functions as or to their corresponding components of the portable biometric authentication device 100 of FIG. 1. Also, the terminal device 200c may include a NFC antenna 210c, a NFC subsystem 220c, and a personal authentication unit 230c. The NFC antenna 210c, the NFC subsystem 220c, and the personal authentication unit 230c of the terminal device 200c may perform the same or similar functions as or to their corresponding components of the terminal device 200 of FIG. 1.

Referring to FIG. 12, the personal authentication unit 230c of the terminal device 200c may provide magnetic stripe data MSD to the NFC subsystem 220c. The magnetic stripe data (MSD) is information that is stored by spreading a magnetic substance on a credit card, etc. and may include payment information. When the personal authentication succeeds by using a personal authentication method according to any one of embodiments of the inventive concept, the personal authentication unit 230c may provide the magnetic stripe data to the NFC subsystem 220c in order to transmit the magnetic stripe data to the portable biometric authentication device 100c.

Referring to FIG. 12, the portable biometric authentication device 100c (e.g., the control subsystem 130c) may include the NFC controller 131c and an inductor driver 133c. The NFC controller 131c may receive the magnetic stripe data MSD from the terminal device 200c via the NFC antenna 110c and may provide the magnetic stripe data MSD to the inductor driver 133c. The inductor driver 133c may generate a signal transmitted to the inductor 160c in such a manner that the inductor 160c generates a magnetic flux to the outside of the portable biometric authentication device 100c based on the magnetic stripe data MSD. The magnetic stripe data MSD may be transmitted to a card terminal through the magnetic flux or a magnetic pulse generated by the inductor 160c. The portable biometric authentication device 100c may improve payment convenience by supporting the MST and the personal authentication using the biometric information.

Figure 13:
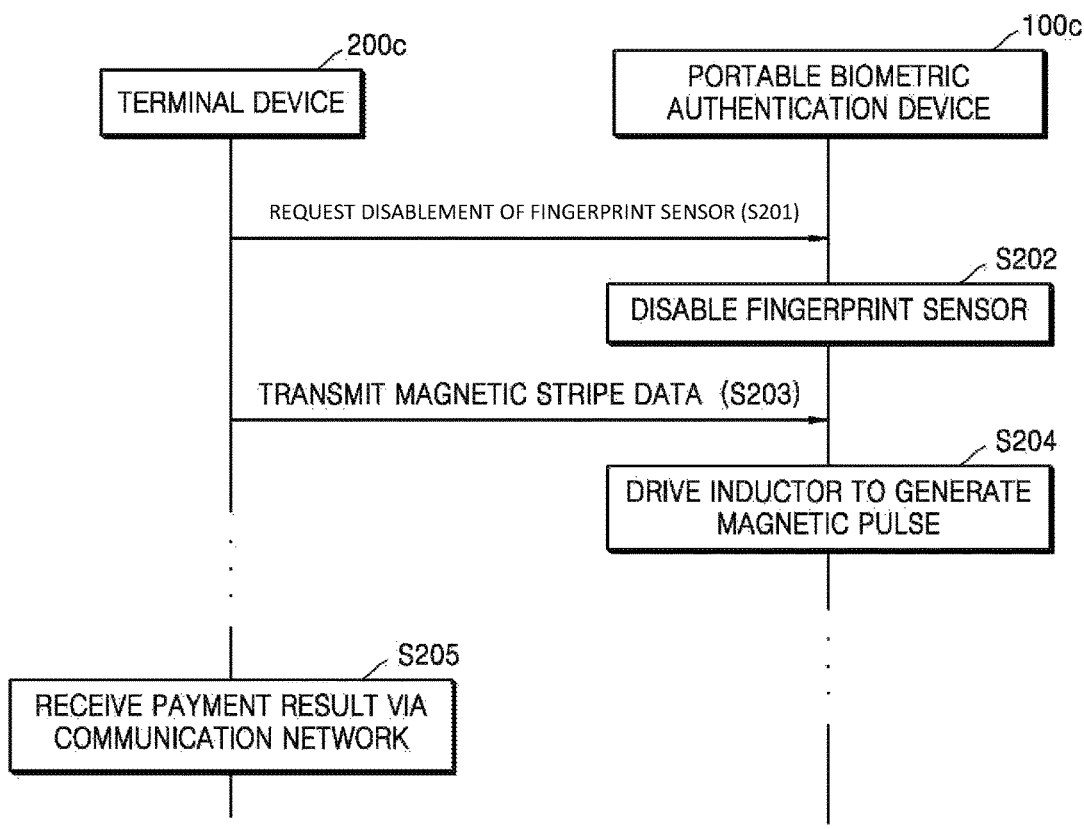
FIG. 13 is a flowchart of operations performed between the portable biometric authentication device and the terminal device of FIG. 12, according to an exemplary embodiment.

FIG. 13 is a flowchart describing in one example the operations performed between the portable biometric authentication device 100c and the terminal device 200c of FIG. 12 according to an exemplary embodiment. That is, FIG. 13 shows an operation of performing, by the portable biometric authentication device 100c and the terminal device 200c of FIG. 12, the MST as an example of a security function performed in operation S200 of FIG. 5.

Referring to FIG. 13, the terminal device 200c may request disablement of a fingerprint sensor 141c in operation S201. Then, in operation S202, the fingerprint sensor 141c of the portable biometric authentication device 100c may be disabled. That is, in the portable biometric authentication device 100c to which power is provided from the terminal device 200c via the NFC, the fingerprint sensor 141c (or the sensor subsystem 140c) is disabled to drive the inductor 160c while the MST is being performed, and thus power provided to the fingerprint sensor 141c may be blocked.

In operation S203, the terminal device 200c may transmit the magnetic stripe data to the portable biometric authentication device 100c. The magnetic stripe data may be encrypted, and the encrypted magnetic stripe data may be transmitted to the portable biometric authentication device 100c using NFC.

In operation S204, an operation of operating the inductor 160c may be performed to generate the magnetic pulse in the portable biometric authentication device 100c. For example, the NFC controller 131c may provide the magnetic stripe data received from the terminal device 200c to the inductor driver 133c, and the inductor driver 133c may drive the inductor 160c based on the magnetic stripe data. Accordingly, the inductor 160c may generate a magnetic pulse corresponding to the magnetic stripe data.

In operation S205, the terminal device 200c may receive a payment result via a communication network. For example, the terminal device 200c may be a mobile phone that communicates with a bank server via a wireless communication network and may receive the payment result, which is produced by transmission of the magnetic stripe that is performed in operations S201 to S204, from the bank server.

Figure 14:
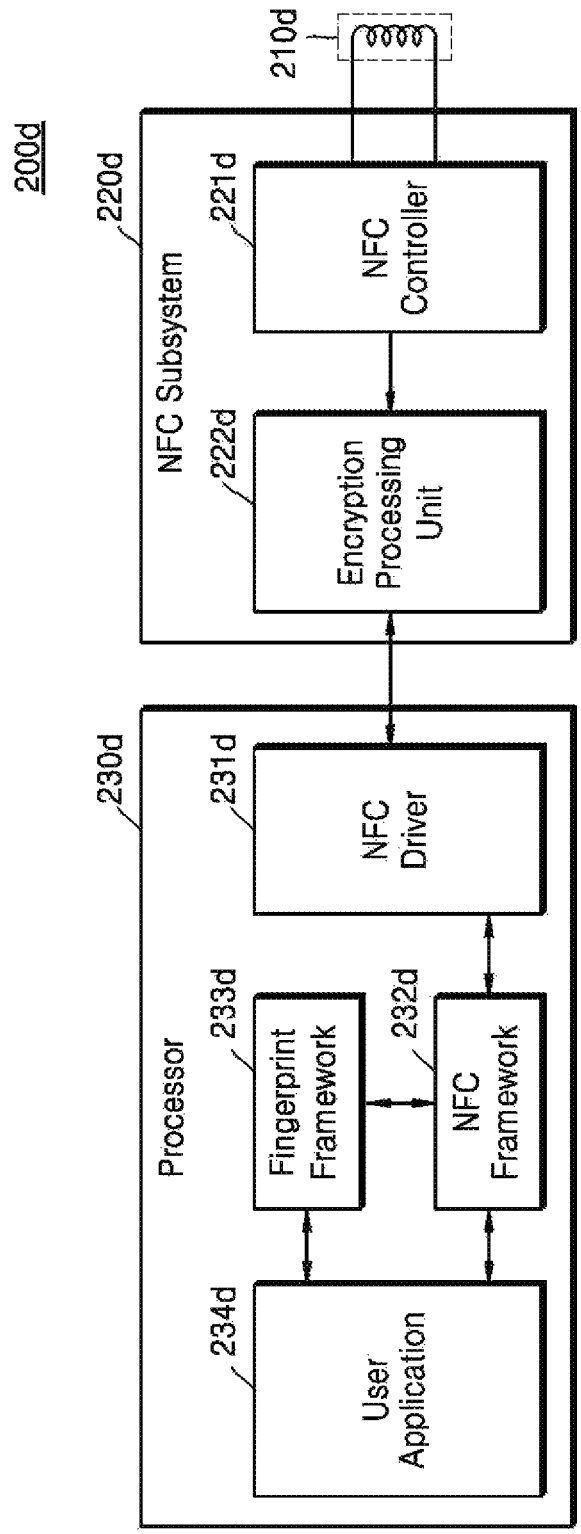
FIG. 14 is a block diagram of a terminal device according to an exemplary embodiment.

FIG. 14 is a block diagram illustrating in one example a terminal device 200d according to an exemplary embodiment. As shown in FIG. 14, a NFC subsystem 220d may include a NFC controller 221d and an encryption processing unit 222d. The NFC controller 221d and the encryption processing unit 222d may perform the same or similar functions as or to the NFC controller 221a and the encryption processing unit 222a of FIG. 4.

Referring to FIG. 14, the terminal device 200d may include a processor 230d. The processor 230d may be a multi-core processor including two or more cores for independently executing instructions. The processor 230d may execute an operating system that provides a kernel space and a user space. For example, as shown in FIG. 14, the processor 230d may execute a NFC driver 231d in the kernel space and may execute a NFC framework 232d, a fingerprint framework 233d, and a user application 234d in the user space. The framework (e.g., the NFC framework 232d or the fingerprint framework 233d) may provide generic functionality to the user space, and the user application 234d may be efficiently designed based on the NFC framework 232d or the fingerprint framework 233d.

Methods of operating a terminal device according to the above-described embodiments may be performed by the processor 230d. For example, operations, for example, payment, banking, etc., which require personal authentication may be implemented by the user application 234d. Through the fingerprint framework 233d, the user application 234d may request personal authentication using fingerprints when a security function is performed. The fingerprint framework 233d may perform at least one of operations S100 to S200 of FIG. 5 by communicating with a portable biometric authentication device (e.g., the portable biometric authentication device 100 of FIG. 1) through the NFC framework 232d. The NFC framework 232d may provide an interface for the NFC to the user application 234d and the fingerprint framework 233d, and the NFC driver 231d may provide the NFC framework 232d with an interface regarding the NFC subsystem 220d that is an independent hardware device.

Figure 15:
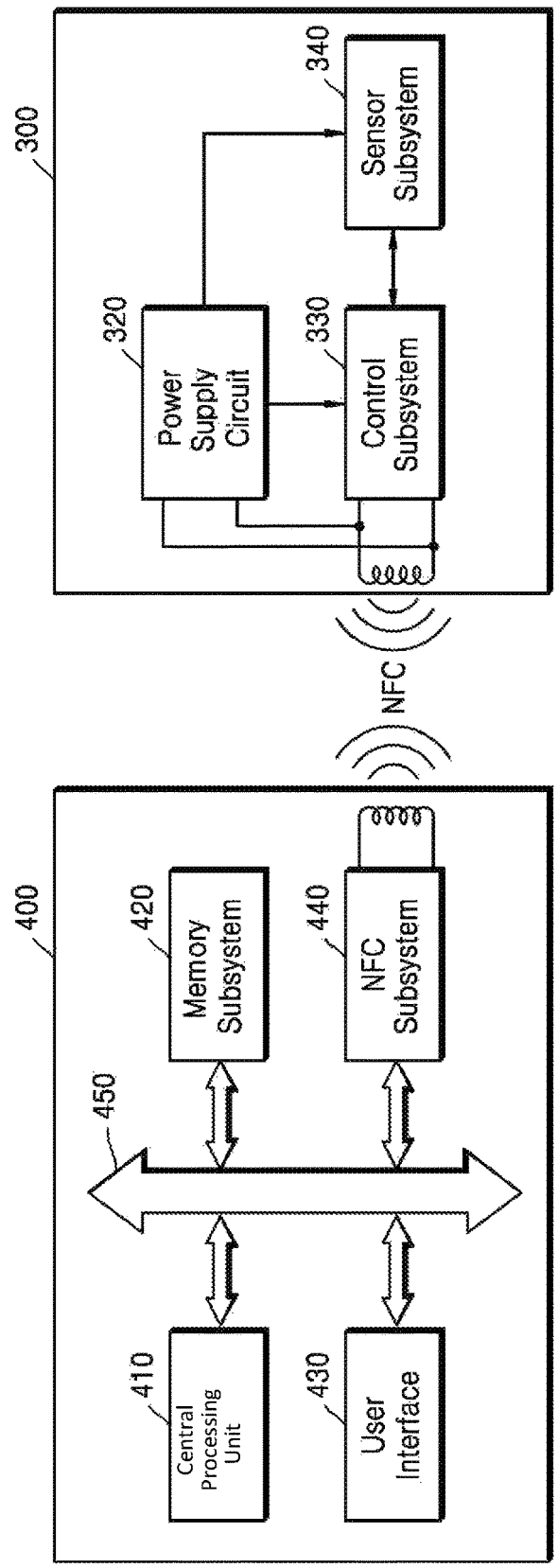
FIG. 15 is a block diagram of a computing system and a portable biometric authentication device according to an exemplary embodiment.

FIG. 15 is a block diagram illustrating a computing system 400 and a portable biometric authentication device 300 according to an exemplary embodiment. According to an exemplary embodiment, the portable biometric authentication device 300 may communicate with the computing system 400 using NFC.

Referring to FIG. 15, the computing system 400 may include a central processing unit 410, a memory subsystem 420, a user interface 430, and a NFC subsystem 440. The central processing unit 410, the memory subsystem 420, the user interface 430, and the NFC subsystem 440 may communicate with each other via a bus 450. Although not shown in FIG. 15, the computing system 400 may communicate with a video card, a sound card, a memory card, a USB device, or the like or may further include a port communicating with other devices.

The central processing unit 410 may perform certain calculations or certain tasks. The central processing unit 410 may access the memory subsystem 420 via the bus 450 and may execute multiple instructions stored in the memory subsystem 420. According to an exemplary embodiment, the central processing unit 410 may perform the operations of the personal authentication unit or the operations of the processor 230*d* of FIG. 14.

The memory subsystem 420 may include one or more memory devices and memory controllers. In an exemplary embodiment, the memory subsystem 420 may include volatile memory device, and the volatile memory device may function as a cache memory. For example, the memory subsystem 420 is a volatile memory device and may include Dynamic Random Access Memory (DRAM), Static Random Access Memory (SRAM), mobile DRAM, Double Data Rate Synchronous Dynamic Random Access Memory (DDR SDRAM), Low Power DDR (LPDDR) SDRAM, Graphic DDR (GDDR) SDRAM, Rambus Dynamic Random Access Memory (RDRAM), or the like.

The memory subsystem 420 may be a non-volatile memory device, and the non-volatile memory device may store instructions that form a program executed in the central processing unit 410. For example, the memory subsystem 420 may be a non-volatile memory device and may include Electrically Erasable Programmable Read-Only Memory (EEPROM), flash memory, PRAM, RRAM, NFGM, PoRAM, MRAM, FRAM, or the like.

The user interface 430 may include an input device such as a keyboard, a keypad, a mouse, or the like in order to receive an input signal from the user and may include an output device such as a printer, a display device, or the like in order to provide an output signal to the user.

The NFC subsystem 440 may perform NFC with electronic devices that include the portable biometric authentication device 300 and support the NFC. According to an exemplary embodiment, the NFC subsystem 440 may control transmission of binary data, authentication data, an encryption key, magnetic stripe data, or the like to the portable biometric authentication device 300 via a NFC antenna. Also, the NFC subsystem 440 may control reception of a fingerprint image, the authentication data, the encryption key, or the like from the portable biometric authentication device 300 via the NFC antenna.

Referring to FIG. 15, the portable biometric authentication device 300 may include a power supply circuit 320, a control subsystem 330, and a sensor subsystem 340, and the power supply circuit 320, the control subsystem 330, and the sensor subsystem 340 may each perform operations according to exemplary embodiments. For example, the power supply circuit 320 may generate power based on the electromagnetic field induced from the electromagnetic field generated by the computing system 400 and may respectively provide the generated power to the control subsystem 330 and the sensor subsystem 340.

Figure 16:
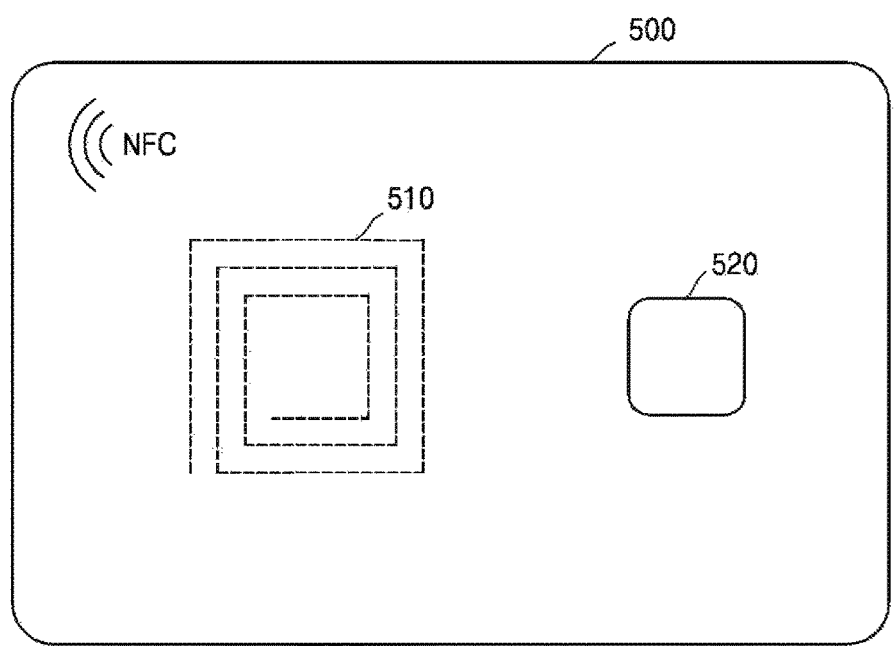
FIG. 16 is a diagram of a card according to an exemplary embodiment.

FIG. 16 is a conceptual diagram of a card 500 according to an exemplary embodiment. A portable biometric authentication device may be embodied as the card 500 due to a simple structure and a small form factor. That is, as shown in FIG. 16, the card 500 may include a NFC antenna 510 and a fingerprint sensor 520.

The card 500 may be used as an independent payment medium such as a credit card, a debit card, etc. or may be used as a personal authentication device using the NFC and the fingerprint image.

While the inventive concept has been particularly shown and described with reference to embodiments thereof, it will be understood that various changes in form and details may be made therein without departing from the scope of the following claims.

What is claimed is:

1. A terminal device configured to communicate with a portable biometric authentication device, the terminal device comprising:
   a first near field communication (NFC) antenna configured for near field communication;
   an NFC controller configured to generate an electromagnetic field using the first NFC antenna, such that the portable biometric authentication device operates in response to at least one power voltage generated by the portable biometric authentication device in response to an electrical current induced in a second NFC antenna of the portable biometric authentication device by the electromagnetic field; and
   a personal authentication component configured to perform personal authentication for a user of the portable biometric authentication device in response to biometric information provided by the user to the portable biometric authentication device,
   wherein the NFC controller is further configured to receive the biometric information from the portable biometric authentication device using the first NFC antenna and to provide the biometric information received from the portable biometric authentication device to the personal authentication component.

2. The terminal device of claim 1, wherein the NFC controller is further configured to generate a biometric authentication request and communicate the biometric authentication request to the portable biometric authentication device via the electromagnetic field using the first NFC antenna, and receive the biometric information in response to the biometric authentication request.

3. A method of operating a system including a terminal device using near field communication (NFC) to communicate with a portable biometric authentication device, the method comprising:
   powering operation of the portable biometric authentication device solely from an electromagnetic field generated by the terminal device;
   generating a request for biometric information of a user of the portable biometric authentication device in the terminal device;
   communicating the request for biometric information from the terminal device to the portable biometric authentication device using the NFC;
   generating first biometric information from a fingerprint image provided by the user to a fingerprint sensor disposed in the portable biometric authentication device responsive to the request for biometric information communicated from the terminal device;
   communicating the first biometric information from the portable biometric authentication device to the terminal device using the NFC; and
   performing personal authentication of the user in the terminal device in response to the first biometric information.

4. The method of claim 3, further comprising:
forming an encrypted NFC channel between the terminal device and the portable biometric authentication device in response to generation of a security function request in the terminal device; and
encrypting the first biometric information in the portable biometric authentication device to generate encrypted first biometric information and communicating the encrypted first biometric information from the portable biometric authentication device to the terminal device as the first biometric information via the encrypted NFC channel.

5. The method of claim 4, further comprising:
decrypting the encrypted first biometric information in the terminal device to generate second biometric information; and
comparing the second biometric information to registered biometric information for the user, such that the performing the personal authentication of the user is made according to a result of the comparing the second biometric information to the registered biometric information.

6. The method of claim 4, wherein the forming the encrypted NFC channel between the terminal device and the portable biometric authentication device comprises:
generating a first encryption key in the terminal device and communicating the first encryption key to the portable biometric authentication device; and
generating a second encryption key in the portable biometric authentication device in response to the first encryption key and communicating the second encryption key from the portable biometric authentication device to the terminal device.

7. The method of claim 6, further comprising:
encrypting data in the terminal device using the second encryption key and communicating the encrypted data to the portable biometric authentication device;
decrypting the encrypted data in the portable biometric authentication device using the second encryption key,
wherein the generating first biometric information comprises encrypting the fingerprint image using the first encryption key.

8. The method of claim 3, further comprising:
before generating the request for biometric information in the terminal device, authenticating the portable biometric authentication device.

9. The method of claim 8, wherein the authenticating the portable biometric authentication device comprises:
generating a first hash value in the terminal device from first authentication data;
communicating the first authentication data from the terminal device to the portable biometric authentication device;
generating a first test hash value in the portable biometric authentication device from the first authentication data;
communicating the first test hash value from the portable biometric authentication device to the terminal device; and
comparing the first test hash value with the first hash value in the terminal device.

10. The method of claim 3, further comprising:
before generating the request for biometric information in the terminal device, authenticating the terminal device.

11. The method of claim 10, wherein the authenticating the terminal device comprises:
generating a request for second authentication data in the terminal device;
generating the second authentication data in the portable biometric authentication device and generating a second hash value from the second authentication data responsive to the request for the second authentication data;
communicating the second authentication data from the portable biometric authentication device to the terminal device;
generating a second test hash value in the terminal device from the second authentication data;
communicating the second test hash value from the terminal device to the portable biometric authentication device; and
comparing the second test hash value with the second hash value in the terminal device.

12. The method of claim 3, wherein the powering the operation of the portable biometric authentication device solely from the electromagnetic field generated by the terminal device comprises:
using a NFC antenna of the portable biometric authentication device to detect the electromagnetic field; and
generating at least one power voltage from an electrical current induced in the NFC antenna by the electromagnetic field, wherein the portable biometric authentication device is powered solely by the at least one power voltage.

13. A method of operating a system including a terminal device using near field communication (NFC) to communicate with a portable biometric authentication device, the method comprising:
powering operation of the portable biometric authentication device solely from an electromagnetic field generated by the terminal device;
generating a request for biometric information of a user of the portable biometric authentication device in the terminal device;
generating first biometric information from a fingerprint image provided by the user to a fingerprint sensor disposed in the portable biometric authentication device;
communicating the first biometric information from the portable biometric authentication device to the terminal device using the NFC; and
performing personal authentication of the user in the terminal device in response to the first biometric information;
communicating magnetic stripe data from the terminal device to the portable biometric authentication device using the NFC; and
driving an inductor in the portable biometric authentication device to generate a magnetic pulse in the portable biometric authentication device based on the magnetic stripe data.

* * * * *